US007325596B2

(12) United States Patent
Ebner

(10) Patent No.: US 7,325,596 B2
(45) Date of Patent: Feb. 5, 2008

(54) POTHEAD ASSEMBLY

(75) Inventor: Paul D. K. Ebner, Shawnee, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 10/907,139

(22) Filed: Mar. 22, 2005

(65) Prior Publication Data

US 2006/0213665 A1 Sep. 28, 2006

(51) Int. Cl.
*E21B 43/00* (2006.01)
*H02G 15/04* (2006.01)

(52) U.S. Cl. .................. 166/65.1; 166/105; 174/75 D; 439/877

(58) Field of Classification Search ................ 166/369, 166/378, 105, 65.1; 439/271, 275, 283, 374, 439/569, 570, 877; 174/74 R, 75 D
See application file for complete search history.

(56) References Cited

U.S. PATENT DOCUMENTS 2,522,572 A * 9/1950 Fengler et al. ................ 174/20
2,958,723 A * 11/1960 Logan et al. ............. 174/84 C
3,294,993 A * 12/1966 Komor et al. ................ 310/71
4,927,386 A * 5/1990 Neuroth ...................... 439/589
5,667,009 A * 9/1997 Moore ....................... 166/65.1
5,801,465 A * 9/1998 Yamada ....................... 310/71
6,202,743 B1 * 3/2001 Moore ....................... 166/65.1
6,676,447 B1 * 1/2004 Knox ......................... 439/587
7,033,216 B2 * 4/2006 Ito ............................ 439/587

FOREIGN PATENT DOCUMENTS

RU 2103772 C1 1/1998
SU 1525789 A1 11/1989

* cited by examiner

*Primary Examiner*—Kenneth Thompson
(74) *Attorney, Agent, or Firm*—Trop, Pruner & Hu, P.C.; Kevin Brayton McGoff; Bryan P. Galloway

(57) ABSTRACT

A connector that is usable with a subterranean well includes a flange member and a tube. The flange member is adapted to form a connection with a submersible component. The tube is adapted to connect to the flange member and receive a cable that has a conductor that is surrounded by an insulative layer. The tube is crimped into the insulative layer.

24 Claims, 4 Drawing Sheets

POTHEAD ASSEMBLY

BACKGROUND

The present invention generally relates to a pothead assembly.

A typical subterranean well includes submersible equipment to which wet electrical connections are made. For example, referring to FIG. 1, a production system 10 of a subterranean well may include a tubular string 12 that extends inside a casing string 14 and through a production zone 20 of the well. The string 12 typically has a central passageway for purposes of communicating well fluid to the surface of the well. To aid in producing this well fluid, the string 12 may include a submersible pump 22.

The submersible pump 22 may operate from power that is provided from the surface of the well by one or more electrical cables 16. For example, for a three-phase pump, three electrical cables 16 may extend from the surface of the well along the string 12 to the pump 22.

Due to the very nature of its operation, the submersible pump 22 is surrounded by well fluid. A connection assembly 25, or pothead, is used to connect the electrical power cables 16 to the motorhead of the pump 22. The sealed connections formed by the pothead 25 should ideally maintain their integrity even in the relatively high temperature and pressure that are present in the well. The integrity of the sealed connections may be affected by the relative movement that occurs between the cables 16 and the submersible pump 22.

Thus, there exists a continuing need for a pothead that maintains its integrity in the wellbore environment.

SUMMARY

In an embodiment of the invention, a connector that is usable with a well includes a flange member and a tube. The flange member is adapted to form a connection with a submersible component. The tube is adapted to connect to the flange member and receive a cable that has a conductor that is surrounded by an insulative layer. The tube is crimped into the insulative layer.

In another embodiment of the invention, a technique that is usable with a well includes connecting an outer jacket of a cable to a flange member; attaching the flange member to a submersible component; and forming a crimped connection between the flanged member and an insulative layer of the cable.

In yet another embodiment of the invention, a system that is usable with a well includes a submersible component, a cable, a flange member and a tube. The cable has a conductor that is surrounded by an insulative layer. The flange member is adapted to form a connection with the submersible component. The tube is adapted to connect the flange member to the submersible component and receive the cable. The tube is crimped into the insulative layer of the cable.

Advantages and other features of the invention will become apparent from the following description, drawing and claims.

DETAILED DESCRIPTION

Figure 1:
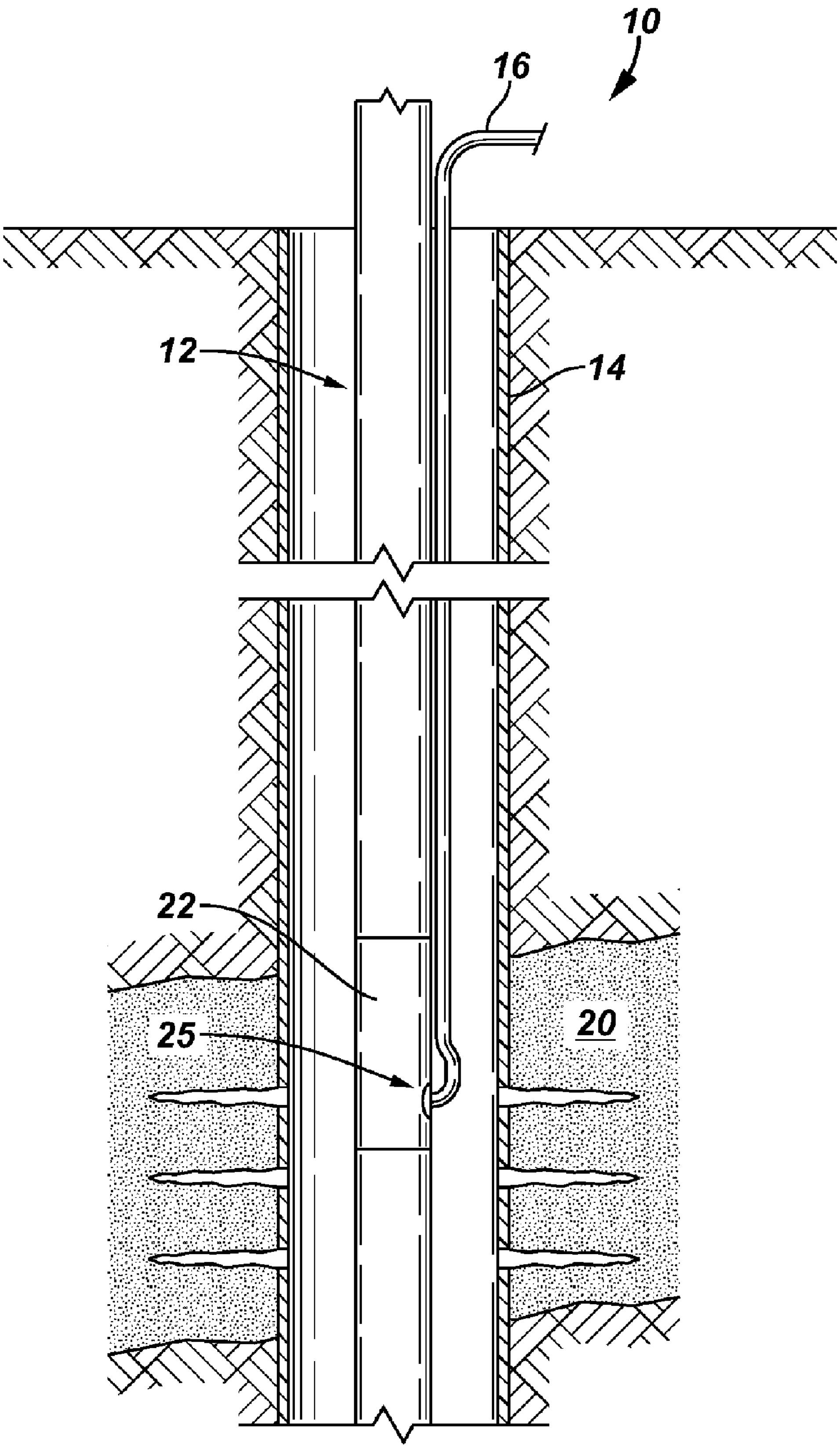
FIG. 1 is a schematic diagram of a pumping system of the prior art.
Figure 2:
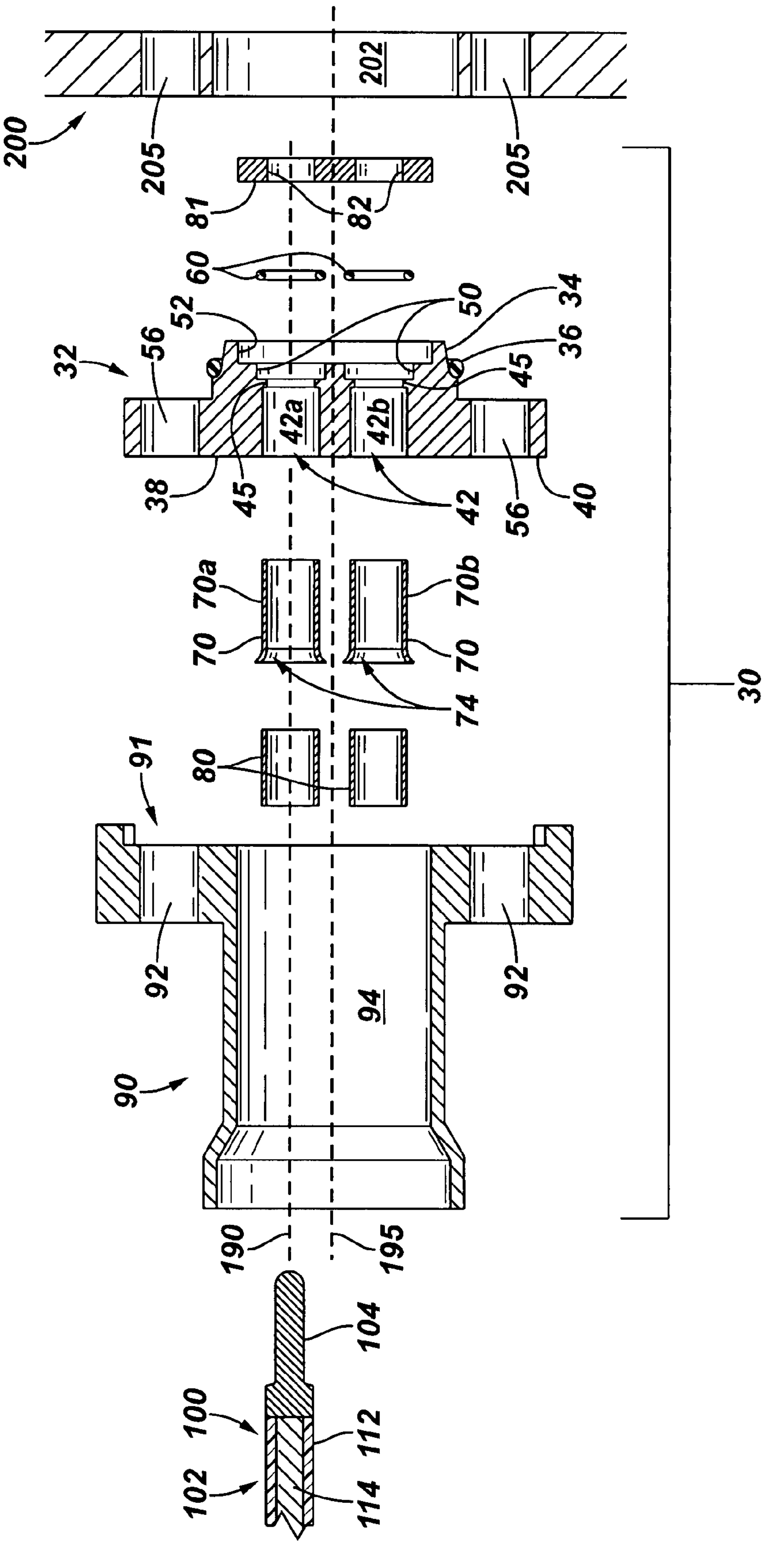
FIG. 2 is an exploded cross-sectional view illustrating a pothead assembly according to an embodiment of the invention.

Referring to FIG. 2, an embodiment 30 of a pothead assembly in accordance with the invention is constructed to form mechanical and sealed connections between motor lead extensions and a motorhead of a submersible component (a submersible pump, for example) inside a well (a subterranean or subsea well). In some embodiments of the invention, the pothead assembly 30 includes a flange insert 32 that sealably attaches to a housing 200 of the submersible component. The flange insert 32 includes a protruding section 34 that is generally coaxial with a longitudinal axis 190 of the pothead assembly 30 and is constructed to be inserted into a mating opening 202 of the housing 200.

When the protruding section 34 is inserted into the opening 202, an O-ring 36 (that circumscribes the longitudinal axis 190 and resides in an annular groove of the protruding section 34) forms a seal between the flange insert 32 and the housing 200. As described further below, the flange insert 32 provides a structure of the pothead assembly 30, which is used to both seal one or more electrical cables 100 (one cable being depicted in FIG. 2) to the housing 200 as well as provide mechanical connections between the cable 100 and the housing 200.

More specifically, in some embodiments of the invention, the flange insert 32 includes openings 42 (openings 42*a* and 42*b* depicted in FIG. 2, as examples) through which (as described below) sealed connections are formed between the cables 100 and the submersible component. More specifically, these sealed connections allow motor lead extension connectors 104 (one connector 104 being depicted in FIG. 2) to be electrically connected to associated electrical receptacles (not shown) of a motorhead of the submersible component, in some embodiments of the invention. As depicted in FIG. 2, the openings 42 are each eccentric with respect to the longitudinal axis 190 of the pothead assembly 30, in some embodiments of the invention.

For purposes of illustrating the pothead assembly 30 by way of a specific example, the connection of the electrical cable 100 through the opening 42*a* is depicted in FIG. 2 and described below. It is noted that other electrical cables 100 may be connected in a similar manner (and thus, extend through the other openings 42) in some embodiments of the invention. For example, in some embodiments of the invention, the pothead assembly 30 may be used to connect three electrical cables 100 to the submersible component, and these three cables 100 may supply, for example, three-phase power to the submersible component.

As depicted in FIG. 2, the electrical cable 100 extends through the opening 42*a* so that when the pothead assembly 30 is fully assembled, an exposed end 102 of the electrical cable 100 is contained in the opening 42*a*. The terminology "exposed" means that a protective and electrically conductive outer jacket (not depicted in FIG. 2) of the cable 100 is removed, exposing a dielectric, or electrically insulative, layer 112 (a PEEK layer, for example) of the cable 100. As shown in FIG. 2, the insulative layer 112 surrounds an inner electrical wire 114 of the cable 100.

The openings 42 receive flared tubes 70 (flared tubes 70*a* and 70*b*, depicted as examples in FIG. 2) that are sealed (as described below) to the flange insert 32. As depicted in FIG. 2, the opening 42*a* receives a flared tube 70*a* that is coaxial with the axis 190. As its name implies, each flared tube 70 includes a flared opening 74. The flared opening 74 facilitates insertion of the exposed end 102 of the cable 100 into the flared tube 70 and also facilitates insertion of a small tube 80 (a thin-walled tube made from Monel, for example) into the flared tube 70.

More particularly, in some embodiments of the invention, the small tube 80 has an outer diameter that is closely sized to the inner diameter of the flared tube 70 and an inner diameter that is closely sized to the outer diameter of the exposed end 102 of the cable 100. Therefore, in the fully assembled state of the pothead assembly 30, the exposed end 102 of the cable 100 extends through and is sealed to (as described below) the small tube 80; the small tube 80 is located inside and is sealed to the flared tube 70; and the flared tube 70 is at least partially recessed into the opening 42 and sealed to the main body of the flange insert 32.

As described further below, in the assembly of the pothead assembly 30, each tube 80 is slid onto the exposed end 102 of the respective cable 100, and then the small tube 80 is radially crimped so that the resultant annular grooves that are formed from the crimping extend into the insulative layer 112 of the cable 100. These annular grooves secure the cable 100 to prevent relative movement between the cable 100 and the pothead assembly 30. Additionally, as further described below, the crimping of the small tube 80 to the cable 100 provides a redundant seal around the exposed end 102 of the cable 100.

Figure 3:
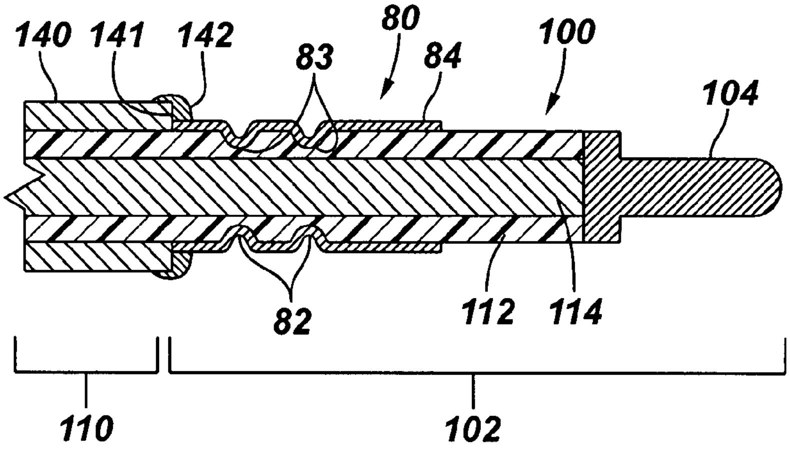
FIG. 3 is a cross-sectional view illustrating a connection between a tube of the pothead assembly and an exposed connection end of an electrical cable according to an embodiment of the invention.

Referring to both FIGS. 2 and 3, as a more specific example, in some embodiments of the invention, the exposed end 102 of the cable 100 may be configured in the following manner before being inserted into the flared tube 70. The small tube 80 is first slid over the exposed end 102 so that, in accordance with some embodiments of the invention, one end 141 of the small tube 80 abuts or at least comes in close proximity to a lead jacket 140 of the cable 100, as depicted in FIG. 3. Thus, the junction of the lead jacket 140 and the free end 102 forms the beginning of the remaining 110 fully encased portion of the cable 100, which extends toward the surface of the well. The lead jacket 140, as shown in FIG. 3, circumscribes the insulative layer 112.

The small tube 80 may be crimped at one or more locations. For example, as depicted in FIG. 3, in some embodiments of the invention, the crimping may form at least two annular grooves 82 in the small tube 80, and these annular grooves 82 circumscribe the electrical wire 114 and extend into (as depicted at reference numerals 83) the insulative layer 112. Near the end 141 of the tube 80, a seam 142 may be formed for purposes of mechanically connecting and sealing the tube 80 to the lead jacket 140. For example, in some embodiments of the invention, the seam 142 may be a solder seam. However, other types of seams may be formed between the tube 80 and the lead jacket 140, in other embodiments of the invention.

In some embodiments of the invention, each annular groove 82 may be formed using a pipe cutter that has a sufficiently dull blade so that as the pipe cutter is rotated about the tube 80, the pipe cutter forms the annular groove 82 in the wall of the tube 80 instead of cutting through the wall. Other techniques may be used to crimp the tube 80 and form one or more of the annular grooves 82, in other embodiments of the invention.

At an end 84 of the tube 80 opposite from the end 141 that abuts the lead jacket 140, the tube 80 is designed to be inserted into the flared tube 70 (see FIG. 2). Furthermore, at this end 84 of the tube 80, a mechanical and sealed connection may be formed between the exterior surface of the tube 80 and the surrounding surface of the flared tube 70. As a more specific example, in some embodiments of the invention, a solder seam may be formed between the exterior surface of the tube 80 (at the end 84) and the interior surface of the flared tube 70, where the flared tube 70 extends from the opening 42. For example, a 95/5 solder may be used in conjunction with an inorganic acid flux to solder each small tube 80 inside its associated flared tube 70, in some embodiments of the invention.

Referring to FIG. 2, among the other features of the pothead assembly 30, in some embodiments of the invention, another fluid seal may be formed between the insulative layer 112 and the flange insert 32. More specifically, in accordance with some embodiments of the invention, the flange insert 32 includes an O-ring chamber 52 that includes annular O-ring grooves 50 that are each sized to receive one of the O-rings 60. Thus, each O-ring groove 50 and the corresponding O-ring 60 (when installed in the groove 50) are concentric with the opening 42.

For each opening 42, an annular shoulder 45 defines an inner stop for the opening 42 to limit the distance in which the flared tube 70 may be inserted into the opening 42 from an exterior face 38 (i.e., the face of the flange insert 32 opposite from the face that contacts the housing 200) of the flange insert 32. Each O-ring groove 50 is located behind each associated annular shoulder 45 for purposes of positioning the O-ring 60 to extend around the insulative layer 112 of the cable 100. Thus, referring also to FIG. 3, when the exposed end 102 of the cable 100 is inserted through the flanged insert 32, the O-ring 60 closely circumscribes the insulative layer 112 between the end 84 of the tube 80 and the connector 104.

Referring back to FIG. 2, for purposes of retaining the O-rings 60 within the O-ring grooves 50, in some embodiments of the invention, the pothead assembly 30 includes an O-ring cover 81 that is constructed to be closely received in the O-ring chamber 52. The O-ring cover 81, in turn, includes openings 82 that are coaxial with the openings 42 (when the cover 81 is assembled to the flange insert 32) but are sized to retain the O-rings 60 inside the O-ring chamber 52. Thus, the connector 104 and a portion of the free end 102 extend beyond the opening 82 so that an appropriate electrical connection (a connection into a motorhead of the submersible component, for example) may be made with the electrical connector 104.

In some embodiments of the invention, the pothead assembly 30 may include a housing 90 that attaches to the exterior face 38 of the flange insert 32. More specifically, the housing 90 includes a recessed portion 91 that is inset to mate with the flange insert 32 that fits therein. The connector housing 90 is generally coaxial with the longitudinal axis 190 of the pothead assembly 30 when the pothead assembly 30 is assembled, and the housing 90 includes an inner chamber 94 that circumscribes the above-described connections between the electrical cables 100 and the tubes 70 and 80. After the above-described connections have been made between the tubes 70 and 80 and the electrical cable 100, the chamber 94 may be filled with a sealant, such as a stainless steel epoxy (as an example).

Among the other features of the pothead assembly 30, in some embodiments of the invention, the connector housing 90 may include one or more openings 92 for purposes of accepting bolts (not shown in FIG. 2) to attach the flange insert 32 to the connector housing 90. Furthermore, in some embodiments of the invention, the flange insert 32 may include one or more openings 56, and the housing 200 may include one or more openings 205, all of which may be used for purposes of receiving bolts to connect the flange insert 32 to the housing 200.

Figure 4:
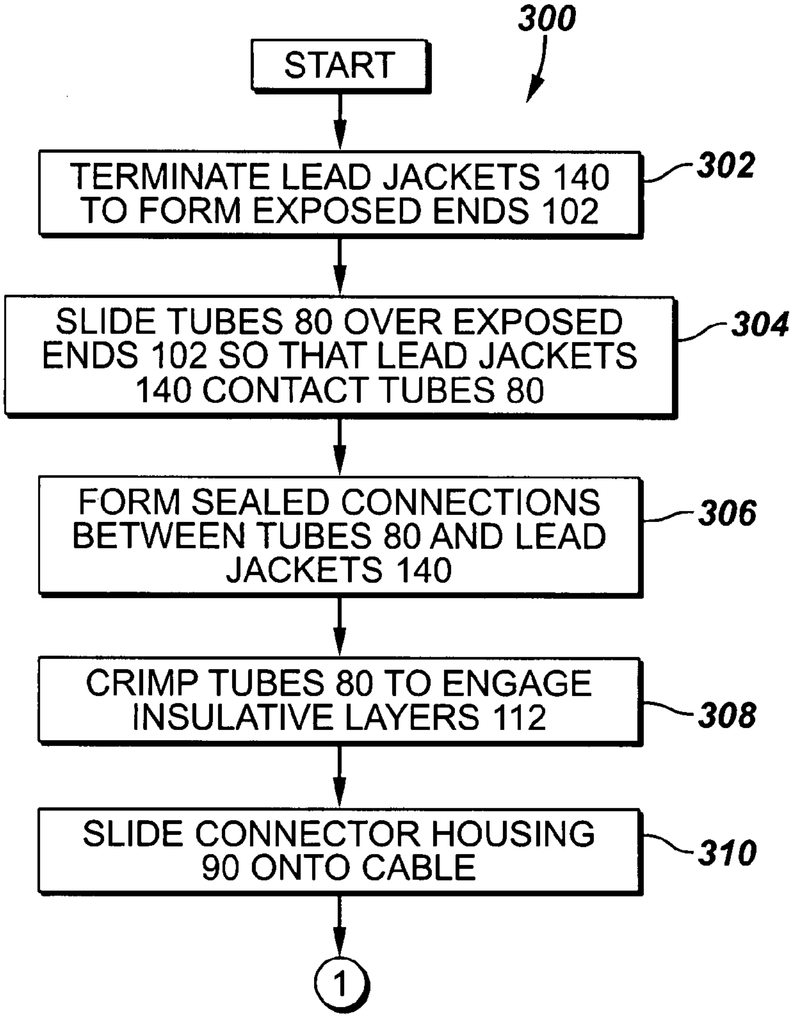
FIGS. 4, 5 and 6 depict a flow diagram illustrating a technique to assemble the pothead assembly according to an embodiment of the invention.

Referring to FIG. 4, to summarize, in accordance with embodiments of the invention, a technique 300 may be used to assemble the pothead assembly 30. Pursuant to the technique 300, the lead jackets 140 of the electrical cables 100 are terminated to form the exposed ends 102, as depicted in block 302. The connectors 104 are also attached to the exposed ends 104. Next, the small tubes 80 are slid over the exposed ends 102 so that the lead jackets 140 contact or at least come near the ends 141 of the tubes 80, pursuant to block 304. It is noted that in other embodiments of the invention, the tube 80 may have (at least near the end 141) an inner diameter that is sized to closely slide over the end of the lead jacket 140. Thus, many variations are possible and are within the scope of the appended claims.

Continuing with the description of the technique 300, after the tubes 80 are slid onto the exposed ends 102, sealed connections are formed between the tubes 80 and the lead jackets 140, pursuant to block 306. For example, in some embodiments of the invention, solder seams may be formed between the tubes 80 and the lead jackets 140. The tubes 80 are then crimped to engage the insulative layers 112, as depicted in block 308.

The technique 300 includes sliding the connector housing 90 onto the electrical cables 100 past the exposed ends 102, as depicted in block 310. It is noted that block 310, as well as other blocks depicted in the technique 300, may be performed in a different order, in that the order that is shown pursuant to the technique 300 is merely for illustrating one out of many possible embodiments of the invention.

Figure 5:
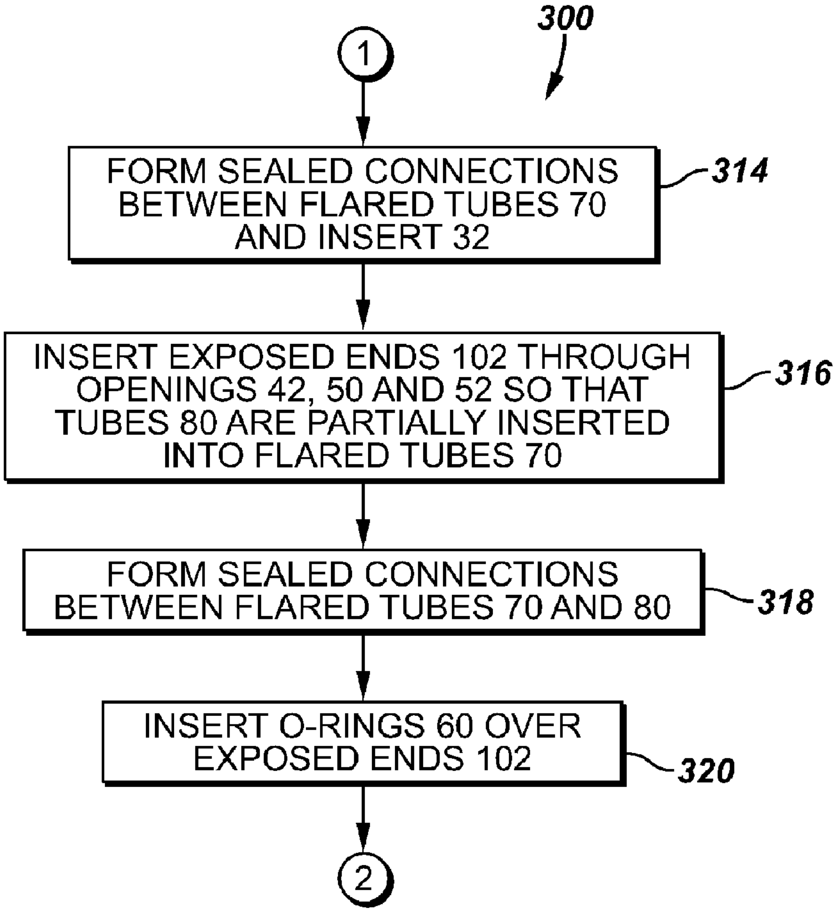
Figure 6:
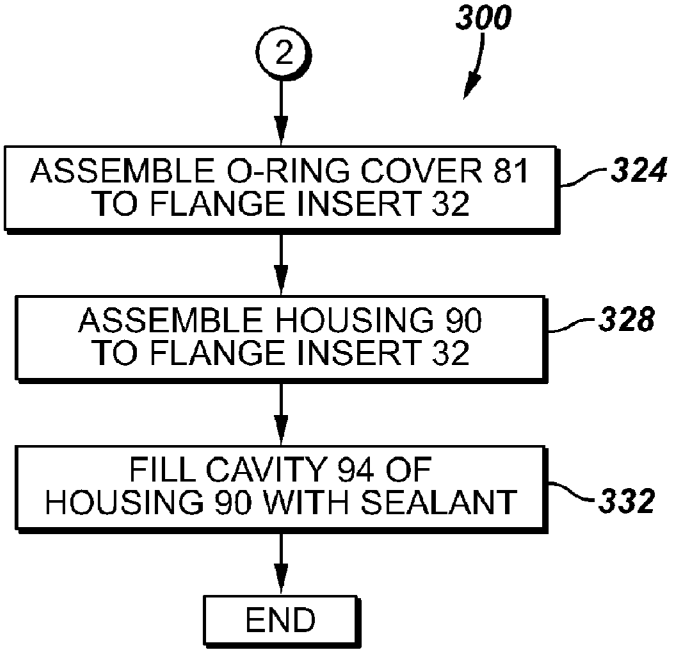

Referring to FIG. 5, the technique 300 includes forming (block 314) sealed connections between the flared tubes 70 and the flange insert 32. For example, in some embodiments of the invention, the flared tubes 70 may be inserted into the openings 40 and then soldered to the surrounding body of the flange insert 32. The exposed ends 102 of the cables 100 are inserted (block 316) through the flared tubes 70 and through the openings 50 and 52 so that the tubes 80 are partially inserted into the flared tubes 70. In this position, sealed connections may then be formed between the tubes 70 and 80, as depicted in block 318. As a more specific example, in some embodiments of the invention, the tubes 70 and 80 may be soldered together using 95/5 solder and inorganic acid flux.

O-rings 60 may then be inserted (block 320) over the exposed ends 102 that extend from the flange insert 32 so that the O-rings 60 reside in the annular O-ring grooves 50. Subsequently, the O-ring cover 81 may be placed in the O-ring chamber 52 and assembled to the flange insert 32 to secure the O-rings 60 in place, as depicted in block 324. Next, in accordance with some embodiments of the invention, the housing 90 is assembled (block 328) to the flange insert 32, and the cavity 94 of the housing 90 is filled (block 332) with a sealant, such as stainless steel epoxy, for example. Other sealants may be used, in other embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A connector usable with a well, comprising:
- a flange member adapted to form a connection with a submersible component;
- a tube adapted to connect to the flange member and receive a cable having a conductor surrounded by an insulative layer that substantially extends along the entire length of the cable, the tube being crimped into the insulative layer to form a fluid seal between the tube and the cable; and
- a seal formed between the insulative layer and the flange member.

2. The connector of claim 1, wherein the crimping of the tube prevents movement of the cable with respect to the flange.

3. The connector of claim 1, wherein the flange comprises another tube adapted to receive the tube that is adapted to receive the cable.

4. The connector of claim 3, further comprising:
- a seal formed between said another tube and the tube that is adapted to receive the cable.

5. The connector of claim 3, wherein said another tube comprises a tube having a flared end to receive the tube that is adapted to receive the cable.

6. The connector of claim 5, further comprising:
- a soldered seam formed between a metal jacket and the tube.

7. The connector of claim 1, further comprising:
- a cover to retain the seal near the flange member.

8. A method usable with a well, comprising:
- connecting an outer jacket of a cable to a flange member;
- attaching the flange member to a submersible component;
- forming a crimped connection between a first tube and an insulative layer of the cable, the insulative layer substantially extending along the entire length of the cable and the crimping connection creating a fluid seal between the first tube and the insulative layer; and
- forming a seal between the insulative layer and the flange member.

9. The method of claim 8, wherein the forming comprises:
- crimping the first tube to prevent movement of the cable with respect to the flange member.

10. The method of claim 9, further comprising:
- inserting the first tube into a second tube that is located in the flange member.

11. The method of claim 10, further comprising:
- forming a seal between the first tube and the second tube.

12. The method of claim 10, further comprising:
- forming a flared end on the second tube to receive the first tube.

13. The method of claim 9, further comprising:
- connecting the first tube to a metallic jacket of the cable.

14. A system usable with a well, comprising:
- a submersible pump;
- a cable having an electrical wire surrounded by an insulative layer, the insulative substantially extending along the entire length of the cable;
- a flange member adapted to form a connection with the submersible component;
- a tube adapted to connect to the flange member and receive the cable, the tube being crimped into the insulative layer of the cable; and
- a seal formed between the insulative layer and the flange member.

15. The system of claim 14, wherein the tube is crimped to prevent movement of the cable with respect to the flange.

16. The system of claim 14, further comprising another tube adapted to receive the tube that is adapted to receive the cable.

17. The system of claim 16, further comprising:

a seal formed between said another tube and the tube that is adapted to receive the cable.

18. The system of claim 16, wherein said another tube comprises a tube having a flared end to receive the tube that is adapted to receive the cable.

19. A method usable with a well, comprising:

connecting an outer jacket of a cable to a flange member;

attaching the flange member to a submersible component;

forming a crimped connection between the flanged member and an insulative layer of the cable;

inserting a first tube into a second tube that is located in the flange member; and forming a seal between the first tube and the second tube, including soldering the first tube and the second tube together.

20. The method of claim 19, wherein the forming comprises:

crimping the first tube to prevent movement of the cable with respect to the flange member.

21. The method of claim 20, further comprising:

connecting the first tube to a metallic jacket of the cable.

22. A system usable with a well, comprising:

a submersible component;

a cable having an electrical wire surrounded by an insulative layer;

a flange member adapted to form a connection with the submersible component, the flange member comprising:

a protruding section to extend into an opening of the submersible component;

a flange larger than the opening; and a groove to retain a seal between the flange member and the submersible component; and a tube adapted to connect to the flange member and receive the cable, the tube being crimped into the insulative layer of the cable.

23. The system of claim 22, wherein the tube is crimped to prevent movement of the cable with respect to the flange.

24. The system of claim 22, further comprising another tube adapted to receive the tube that is adapted to receive the cable.

* * * * *